Figure 1:
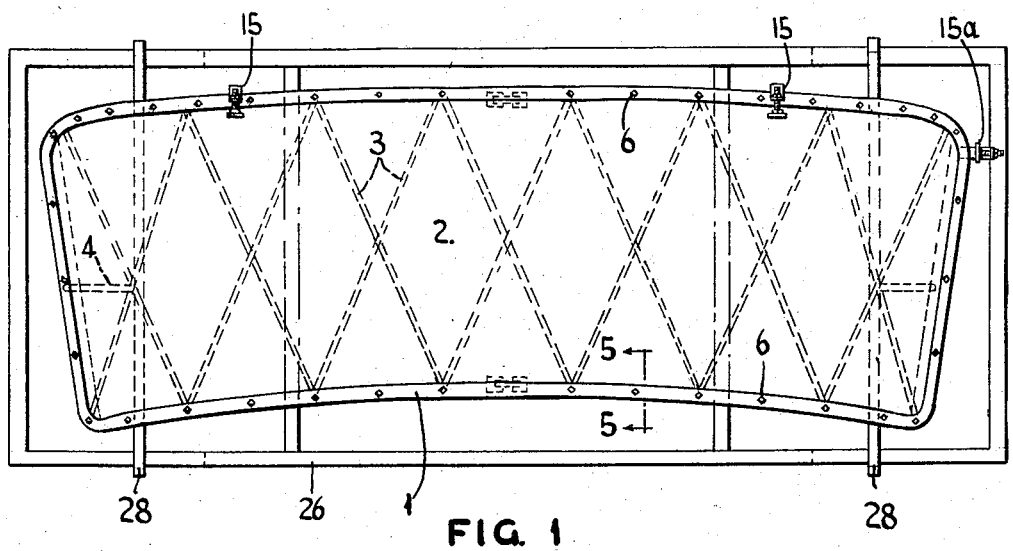

March 10, 1959

W. C. McROBERTS ET AL 2,876,594

APPARATUS FOR BENDING GLASS AND
OTHER HEAT-SOFTENED MATERIALS

Filed Feb. 1, 1954

2 Sheets-Sheet 1

INVENTORS
WILLIAM C. McROBERTS &
LLOYD V. BLACK
BY
Oscar L. Spencer
ATTORNEY

March 10, 1959

W. C. McROBERTS ET AL
APPARATUS FOR BENDING GLASS AND
OTHER HEAT-SOFTENED MATERIALS 2,876,594

Filed Feb. 1, 1954

2 Sheets-Sheet 2

INVENTORS
WILLIAM C. McROBERTS
LLOYD V. BLACK
BY
Oscar L. Spencer
ATTORNEY

United States Patent Office 2,876,594
Patented Mar. 10, 1959

2,876,594

APPARATUS FOR BENDING GLASS AND OTHER HEAT-SOFTENED MATERIALS

William C. McRoberts, New Kensington, and Lloyd V. Black, Tarentum, Pa., assignors to Pittsburgh Plate Glass Company Application February 1, 1954, Serial No. 407,352

4 Claims. (Cl. 49—67)

This invention is directed to glass bending molds of the convex type upon which one or more flat glass sheets are mounted and the assembly passed through a heating furnace wherein the heat softened glass bends to conform to the contour of the mold. More specifically the invention is concerned with the construction details of a novel form of mold of the convex type which heats rapidly and uniformly with a minimum of distortion.

Bending molds of the convex type are so constructed that the glass is initially mounted on the glass shaping surfaces of the mold so that some portion of the glass, such as the intermediate portion, is in contact with the mold during the entire bending operation. The end portions of the glass do not engage the mold until near the end of the bending operation and are frequently at a higher temperature than the center portions of the glass during this final shaping operation. In every use of a mold of the convex type, the mold is at a much higher temperature during final shaping of the glass than when the glass is initially mounted thereon. These temperature changes cause expansion within the mold structure which necessitates suitable compensation for these structural changes if the desired accuracy in the final shape of the glass is to be obtained.

One object of the present invention is to provide a mold which is adjustable to compensate for expansion during heating of the mold as the bending operation proceeds.

Another object of the invention is to provide a mold which permits relative movement between portions of the mold during heating to automatically compensate for relative expansion between the parts of the mold.

A further object of the invention is to provide a mold which provides support for the glass sheet during bending to facilitate retention of the desired contour both longitudinally and transversely of the sheet.

Figure 2:
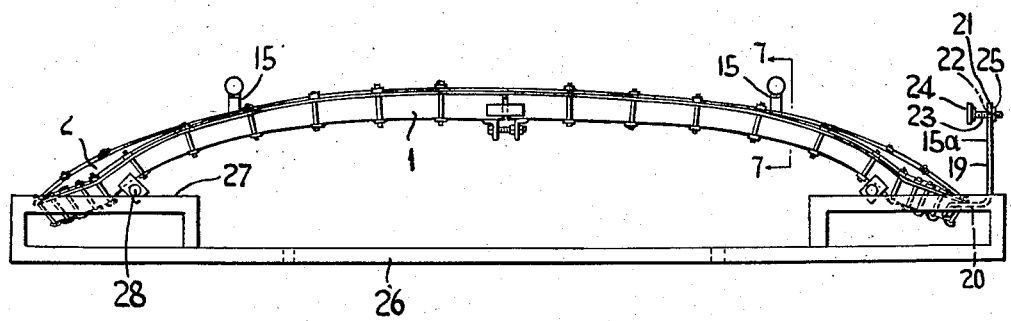
Figure 3:
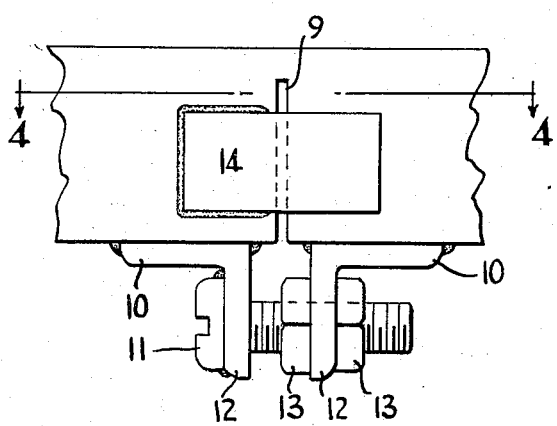
Figure 5:
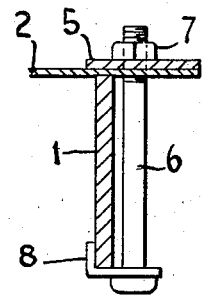
Figure 4:
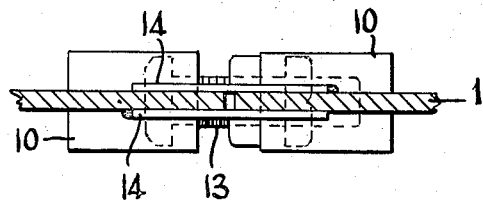
Figure 6:
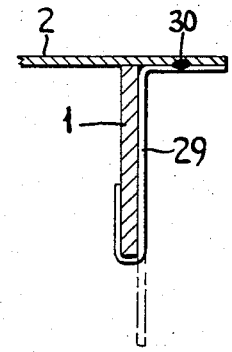
Figure 7:
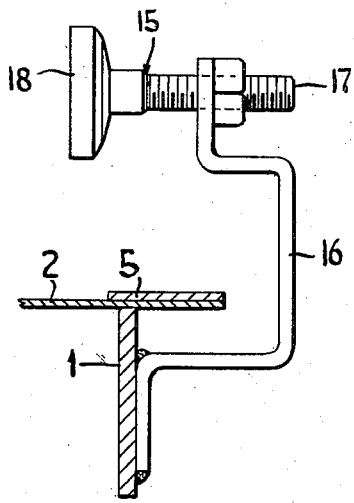

In the drawing forming part of this invention:

Fig. 1 shows a plan view of one form of the mold of the invention and a suitable carrier frame; Fig. 2 shows a side elevation of the mold of Fig. 1 and carrier frame; Fig. 3 shows an enlarged view of the adjustment means for manually compensating for expansion within the mold structure during heating of the glass being bent thereon; Fig. 4 shows a section taken on lines 4—4 of Fig. 3; Fig. 5 shows a cross-section taken along lines 5—5 of Fig. 1 illustrating one form of means for attaching the mold members together; Fig. 6 shows a cross-section taken along lines 5—5 of Fig. 1 illustrating a modification in the means for attaching the mold members together; and Fig. 7 illustrates one form of a member for locating glass upon the mold taken along line 7—7 of Fig. 2.

Referring now to the drawings, the mold comprises a peripheral frame member 1 having a cover plate 2 secured thereto. The frame member 1 preferably is formed from thin flat bars of heat resistant metal such as stainless steel or similar metals and is composed of, as is shown in Figures 1 and 2, a pair of longitudinally extending side members and a pair of transversely extending end members in which each member is connected, end-to-end, to the adjacent members. The volume of metal in the bar is preferably kept to a minimum so that the mold will heat quickly and cool down readily at substantially the same rate at the glass mounted thereon. Likewise the cover plate 2 is preferably of thin heat resisting metal. Suitable bracing may be applied to the peripheral frame 1 such as the members 3 and 4 secured to the frame in any desired manner as by welding.

The means for attaching the cover plate 2 to the frame member 1 forms an important part of the invention. The cover plate must at all times conform to the general contour of the frame and present a smooth supporting surface for the glass. The cover plate and frame members, as shown in the drawings, are of different thickness and size; hence any differences in the rate of expansion between the frame and the cover members could cause distortion of the cover plate which would adversely affect the shape of the glass being bent upon the mold. The frame is likewise subject to distortion through expansion and means for correcting will affect the method of securing the cover plate to the frame.

One means for attaching the cover member 2 to the frame 1 is shown in Fig. 5 of the drawings. The cover plate 2 extends beyond the frame 1 and a second plate 5 mounted on the periphery of the cover plate 2 overlaps the frame 1. A plurality of apertures through cover plate 2 and plate 5 are spaced about the periphery of cover plate 1. The connecting members which secure the cover plate 2 to the frame 1 comprise threaded members such as machine bolts 6 passed through the apertures of cover plate 2 and plate 5 which are secured in position by nuts 7 and depend downwardly adjacent the frame 1. Mounted on each bolt is a clip member 8 which engages the underside of the frame member 1 to secure the frame member 5 and cover plate 2 together. The bolt apertures in the cover plate 2 are made larger than the bolt disposed therein so that the cover plate may expand both longitudinally and transversely of the mold during heating to raise the glass thereon to bending temperature.

The mold of Fig. 1 may be of the desired contour when cold but after heating to glass bending temperature may be so expanded as to no longer provide the necessary contour to which the glass is to be bent. To compensate for this, adjustment members may be incorporated in each side of frame member 1. As shown in Fig. 3 of the drawings, the frame member 1 may be partly cut as at 9 and clips 10 welded to the underside of the frame members on opposite sides of cut 9. A screw threaded member 11 passed through the adjacent spaced legs 12 of clips 10 and provided with nuts 13 permits adjustment by tightening or releasing nuts 13.

Preferably, guide plates 14 may be attached to the frame member on opposite sides of the cut 9 therein to keep the portions of the frame member on opposite sides of the cut 9 in alignment during adjustment. The mold after being heated to glass bending temperature may be checked with a suitable templet and adjustment made to cause it to fit the templet. Since the flat glass sheet must be cut to a size which will provide the desired contour when bent, the contour of the mold at glass bending temperature is the most important dimension of the mold.

As previously stated the glass is mounted at its mid portion on the mold and some means must be provided for positioning the glass relative to the mold to provide uniformity in the sheets bent upon the mold. One method of doing this is shown in Figs. 2 and 7 of the drawings wherein glass stops 15 are disposed at one edge of the mold member 1 on opposite sides of the center thereof and a single member 15A is disposed at one end of the member 1. The glass positioning stops 15 have a vertically disposed member 16 secured to the side of the frame member 1 and extending above the cover plate 2. A suitable threaded aperture is provided in the upper end of the member 16. A screw threaded member 17 is mounted within the aperture and provided at one end with an enlarged head portion 18 for engagement with the glass. At the other end of member 17 is a suitable nut for locking the screw threaded portion in position relative to the member 16.

At the end of the mold, the stop 15A comprises a vertically disposed member 19 having an inwardly offset bottom portion 20 secured to the end of frame member 1 and an upper portion 21 which extends above the plane of any flat glass sheets mounted on the mold preliminary to bending. The upper end of the member 19 is provided with a threaded aperture 22 within which is mounted a screw threaded member 23 having at one end an enlarged head portion 24 for engagement with the ends of the glass sheet and at the other end a nut 25 for locking the screw threaded member in position relative to the member 19. The members 15 at the side of the mold position the glass transversely of the mold and the member 15A at the end of the mold positions the glass in a direction longitudinally of the mold so that the glass in final bent form will occupy the same positions on the mold as successive sheets are bent thereon.

A mold such as shown in Fig. 2 of the drawings requires some form of support during movement through the heating furnace wherein the glass is heated to bending temperature. One form of support, shown in Figs. 1 and 2 of the drawings, comprising a base member 26 of rectangular form having elevated end portions 27 upon which the mold is supported. The height of the end portions 27 of the frame may vary so that molds of various designs will move through the heating furnace at substantially the same level so as to be substantially uniformly spaced from the heating elements within the furnace. In order to support the mold upon the carrier, the mold is provided with transverse members 28 disposed beneath the mold for engagement with the portions 27 of the carrying frame.

A modified means for attaching the cover plate 2 to the mold frame 1 is shown in Fig. 6 of the drawings. In this figure the cover plate 2 extends beyond the frame member 1 and an L-shaped clip 29 is disposed against the frame member 1 and beneath the cover plate 2. The clip member 29 is then spot welded, as at 30, to the cover plate and the free end of the clip which extends below the frame member 1 is turned around the bottom of the frame member into a generally U-shape. A plurality of these clip members 29 are substituted for the screw member 6 shown in Fig. 5 of the drawings. With this type of attachment for the cover plate, the clip members 29 folded about the bottom of the frame member are free to slide along the frame member to compensate for relative expansion between the frame and cover plate during heating of the mold to glass bending temperatures.

When mounting glass sheets upon the above described mold, both the mold and the glass are preferably at the same or ambient temperature. As previously stated the cover plate 2 and member 5 are larger than the glass to be bent thereon so that the glass when mounted on the mold and throughout the entire bending operation can assume the contour of the mold by being uniformly supported upon the smooth surface of the cover plate 2. The glass stop members 15 and 15A are so adjusted that the flat glass sheets being mounted upon the mold may be pushed back into contact with the stops 15 and so positioned as to have their one end in engagement with the stop 15A. The glass and the mold are then passed through a heating furnace where the glass and mold are simultaneously heated and the heat softened glass will sag to assume the contour of the mold.

In many cases the cover plate 2 of the mold may be in direct contact with the glass mounted thereon without injury to the surface of the glass. In those cases where the glass is raised to a sufficiently high bending temperature as to be marred by direct contact with the metal, the sheet 2 may be provided with a thin coating formed from a water solution of a refractory material which when dried will separate the glass from the metal. Many other suitable parting agents may be used which are sufficiently refractory so as not to be affected by the heat to which the glass is subjected during bending. Such materials include glass cloth, asbestos paper or even another sheet of glass.

As a substitute for the bent continuous metal sheet serving as a cover member 2 for the mold, a wire mesh or perforated metal covered with glass cloth, asbestos paper or another sheet of glass may be used.

We claim:

1. A glass bending mold comprising a rigid, peripheral, arcuate metallic frame defining a shape desired for a bent glass sheet, a thin metal cover plate slidably supported on the arcuate upper surface of said frame and extending across and beyond said metallic frame to provide an overhanging marginal portion of said thin metal cover plate, said thin metal cover plate being longitudinaly and transversely movable relative to said rigid, peripheral, arcuate metallic frame and having a total expansion different from said frame when said mold is subjected to heat during bending, a plurality of connecting members secured to said metal cover plate and said peripheral arcuate frame to conform said cover plate to the arcuate shape of said frame, each of said connecting members comprising a depending member extending downwardly adjacent the side of said rigid frame, the upper end of said depending member being secured to said thin metal cover plate and the lower end of said depending member being slidably engaged with the bottom of said rigid, peripheral frame to permit sliding movement of said member along said rigid, peripheral frame during longitudinal and transverse relative movement between said cover plate and said frame while continuously conforming said cover plate to the arcuate shape of said frame during the bending of glass on said mold.

2. A glass bending mold as set forth in claim 1, wherein said overhanging marginal portion of said metal cover plate has a narrow reinforcing plate mounted thereon, said marginal portion of said cover plate and said reinforcing plate being provided with aligned apertures and the upper end of said depending member of each of said connecting members being disposed in said aligned apertures and secured to said reinforcing plate, said aligned apertures being larger than said depending member disposed therein to permit longitudinal and transverse movement of said cover member during the bending of glass on said mold.

3. A glass bending mold as set forth in claim 1 wherein said rigid frame comprises peripheral upwardly extending frame side and end members provided with openings extending upwardly from the bottom edge of said members, a pair of clips secured to said frame, one of said clips being adjacent each of said openings, tightening means extending between and secured to each pair of clips adjacent an opening provided in said frame for bending said frame at said opening and adjusting the arcuate shape of said peripheral frame.

4. A glass bending mold as set forth in claim 3 wherein said peripheral side and end members have a pair of guide plates extending across each opening provided in each of said members and overlying opposite faces thereof, each of said plates being secured to one face of said frame member adjacent only one edge of the opening over which said plate extends.

(References on following page)

References Cited in the file of this patent

UNITED STATES PATENTS

| | | |
|---|---|---|
| 444,579 | Jackson | Jan. 13, 1891 |
| 991,025 | Robier (1) | May 2, 1911 |
| 1,540,339 | Jones | June 2, 1925 |
| 1,606,509 | Campbell | Nov. 9, 1926 |
| 1,735,770 | Marliere | Nov. 12, 1929 |
| 1,914,033 | Miller | June 13, 1933 |
| 2,297,315 | Owen | Sept. 29, 1942 |
| 2,348,278 | Boyles et al. | May 9, 1944 |
| 2,353,071 | Pitou | July 4, 1944 |
| 2,408,526 | Minton | Oct. 1, 1946 |
| 2,508,635 | Badt | May 23, 1950 |
| 2,526,359 | Jendrisak | Oct. 17, 1950 |

FOREIGN PATENTS

| | | |
|---|---|---|
| 4,680 | Great Britain | June 23, 1910 |